United States Patent [19]

Low

[11] 4,220,348
[45] Sep. 2, 1980

[54] CENTER PIVOT STEERING MECHANISM

[76] Inventor: Leonard J. Low, P.O. Box 1927, Sparks, Nev. 89431

[21] Appl. No.: 938,086

[22] Filed: Aug. 30, 1978

[51] Int. Cl.² .............................................. B62D 5/08
[52] U.S. Cl. ................................... 280/95 R; 180/156
[58] Field of Search ............... 180/155, 156, 157, 160; 280/95 R, 95 A

[56] References Cited

U.S. PATENT DOCUMENTS

| | | | |
|---|---|---|---|
| 2,768,699 | 10/1956 | Gardiner | 180/156 |
| 3,109,668 | 11/1963 | Sampietro | 280/95 R |
| 3,874,473 | 4/1975 | Grove | 180/156 |
| 3,994,362 | 11/1976 | Penington | 180/156 |

Primary Examiner—Robert R. Song
Attorney, Agent, or Firm—Herbert C. Schulze

[57] ABSTRACT

This is a unique center pivot steering mechanism for lift trucks, and the like. It is characterized by a unique angular control yoke center mounted upon the steering axle and with equal and like steering control connections to two wheels with an offset control and activation arm connected to a steering control apparatus. The radius of turn of the outer turning wheel is regulated so as to be greater than that of the inner turning wheel.

3 Claims, 12 Drawing Figures

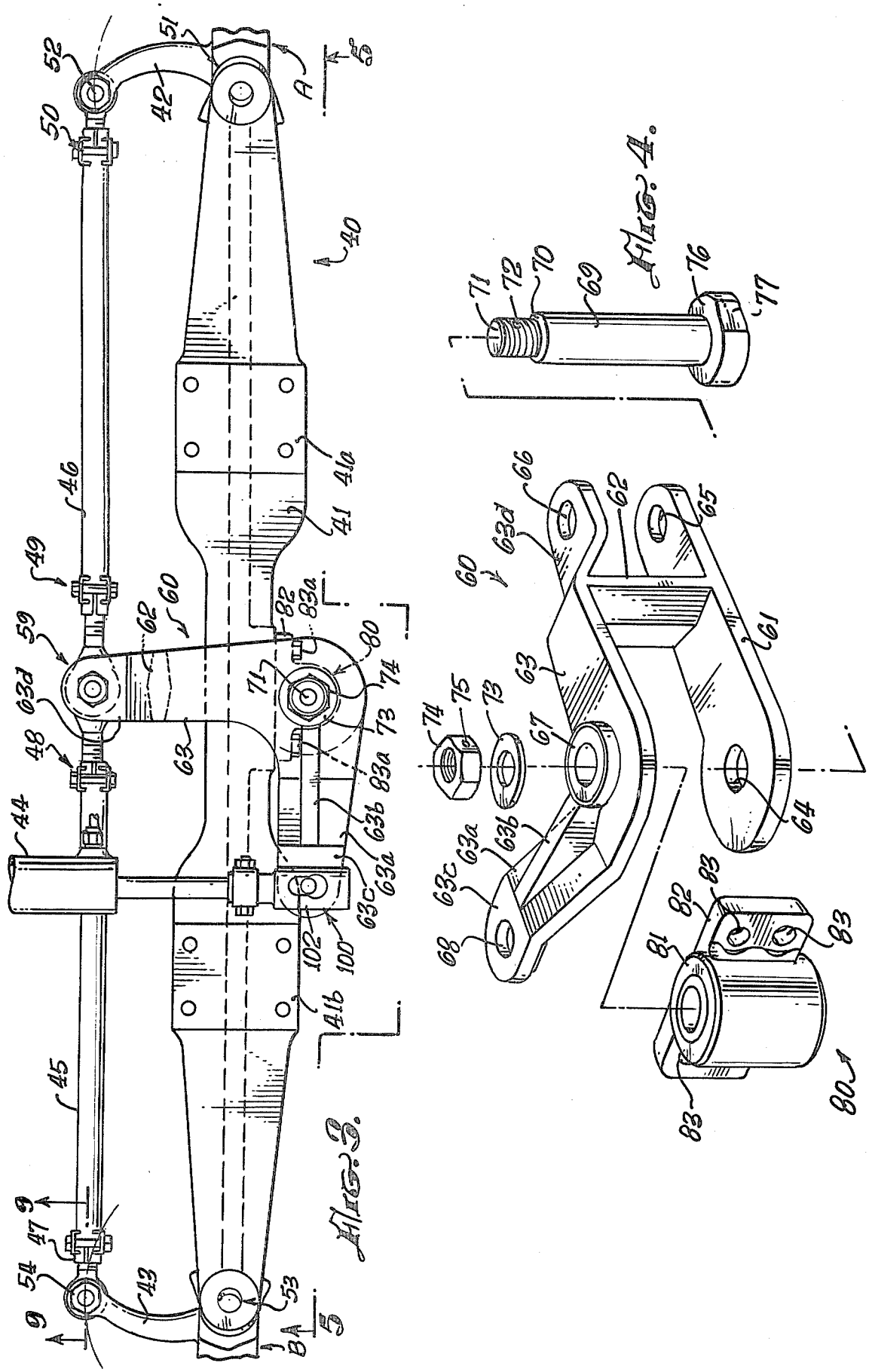

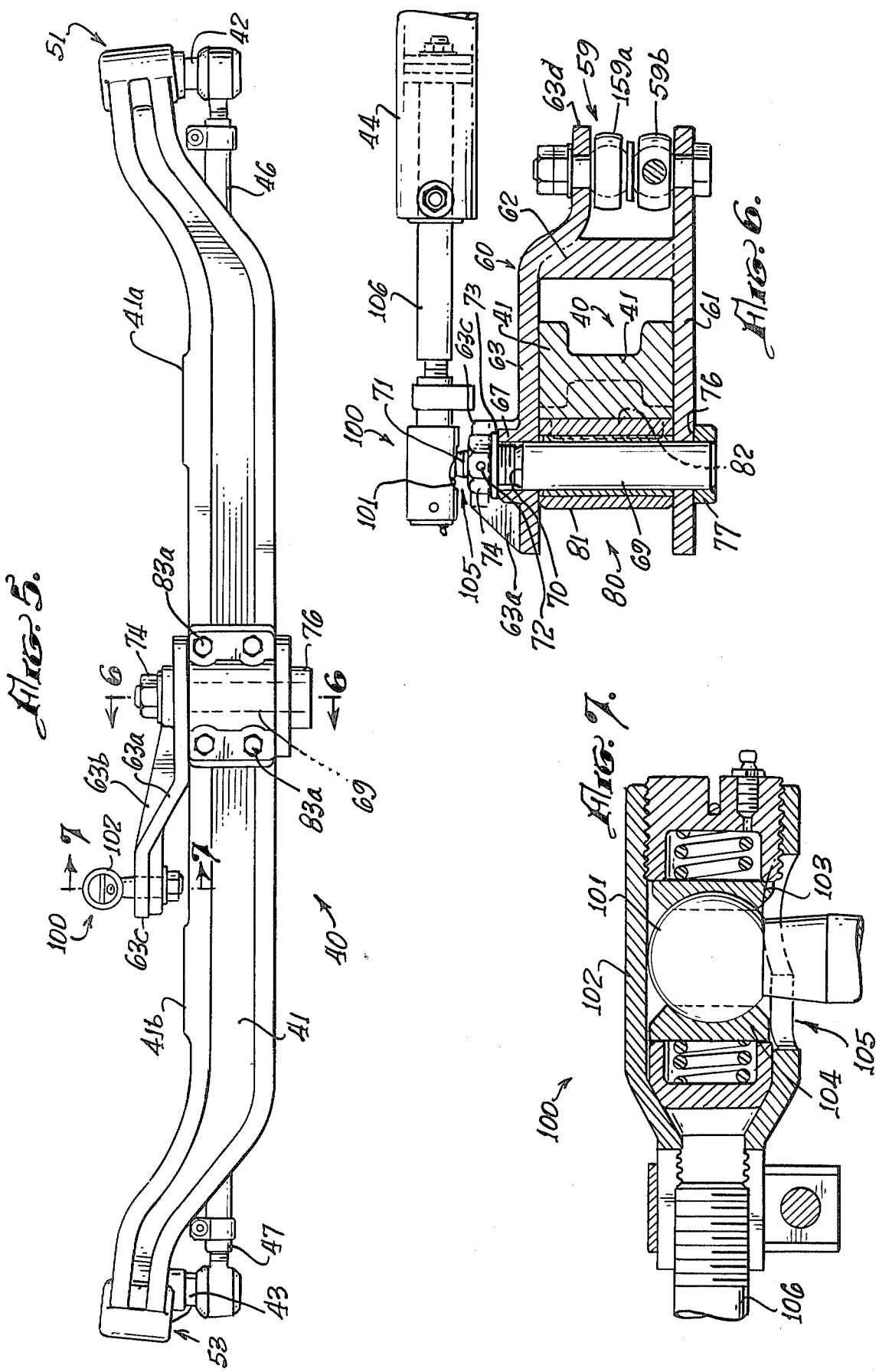

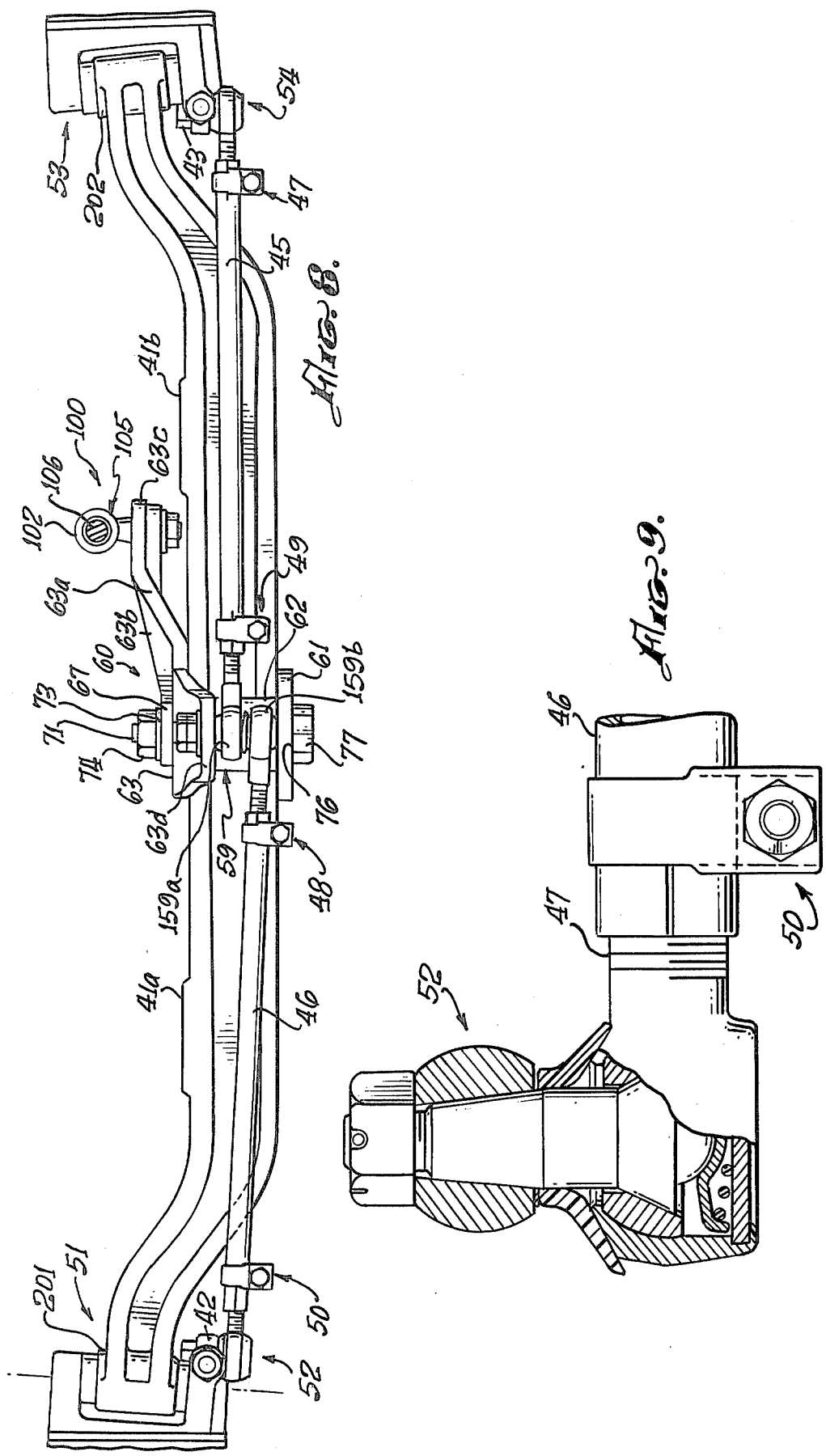

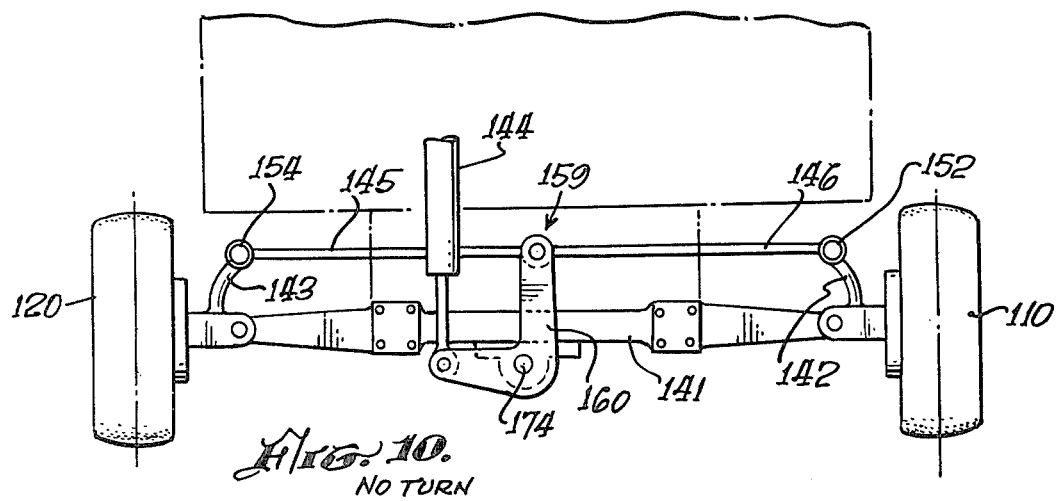
FIG. 10. NO TURN
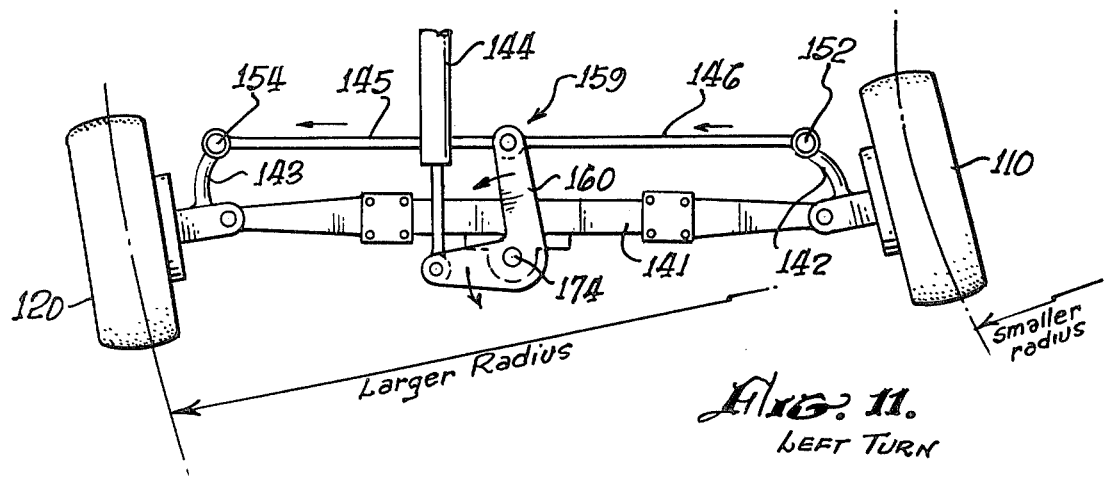
FIG. 11. LEFT TURN
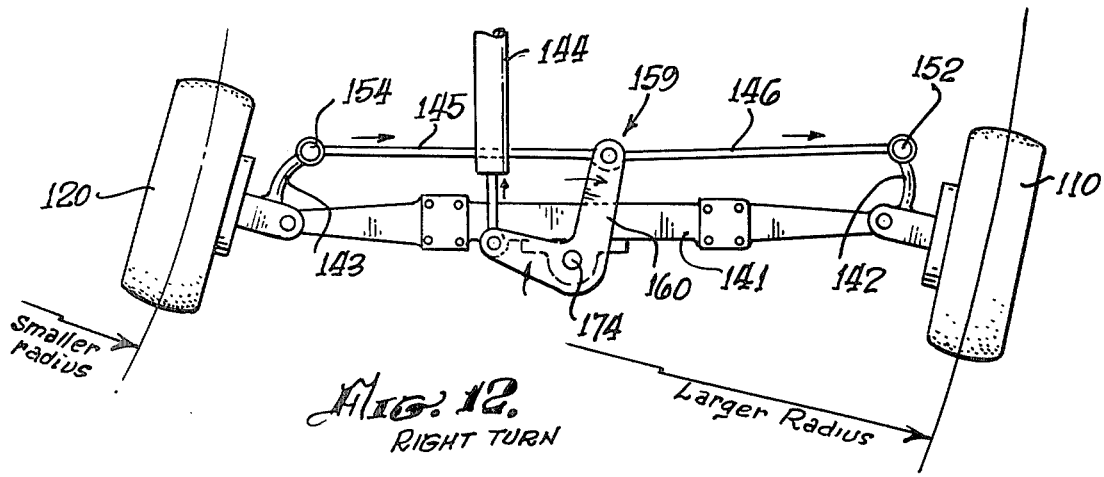
FIG. 12. RIGHT TURN

CENTER PIVOT STEERING MECHANISM

CROSS-REFERENCE TO RELATED PATENT APPLICATIONS

This application is unrelated to any other patent applications filed by me.

BACKGROUND OF THE INVENTION

1. Field of the Invention:

This invention is in the general field of steering mechanisms for vehicles, and is more particularly directed to a steering mechanism for lift trucks and is even more particularly directed to such a mechanism for towable lift trucks in which the steering wheels are at the rear of the truck, and is most precisely directed to such a mechanism wherein the steering control is center mounted with respect to the axle and the linkage to the two wheels and is so arranged as to provide a greater turn radius to the outer wheel than the inner wheel on a turn.

2. Description of the Prior Art:

There are so many different steering devices for vehicles of all types that it is virtually impossible to attempt to cover the field of the prior art. Those skilled in the art however, are familiar with the numerous different types of steering mechanisms.

Steering mechanisms customarily are most closely associated with one or another of a pair of wheels, with a connection to the other wheel.

The present invention is unique and distinct from prior inventions in this field, and particularly in the field of towable lift trucks, in that a steering control device activates a wheel turning member which is center mounted upon the axle which carries the two steering wheels and wherein the device is centrally located between the two steering wheels and equally and identically connected to each by a yoke arrangement which imparts a greater turning radius to the outer wheel than the inner wheel during a turn.

SUMMARY OF THE INVENTION

I have long been involved in the design and production of industrial lift trucks. I have become well acquainted with the so-called "towable" lift trucks which are designed to be towed behind a truck carrying a load. When it is desired to remove the load from the truck, or add to it, the lift truck is disconnected from the truck carrying the load and utilized for such purpose. This, of course, is most desirable where heavy and cumbersome articles are being transported.

In general, towable lift trucks will be towed in a backwards direction behind the truck carrying the load. The means by which this is accomplished is well known.

A major problem, however, is that the customary lift truck is not so designed as to be capable, at its rear wheels, of traversing difficult or uneven terrain, either in the towing mode or in actual use at a location.

One of the principal difficulites is in the steering. The customary steering mechanisms are normally gear and pinion type arrangements which are well known in the art. The limitations of the customary steering apparatus are also well known in the art and, among other things, such apparatus normally requires a great deal of strength and work for a lift truck operator resulting in operator fatigue.

It must be understood that the unusual nature of the lift truck, having a great weight upon the rear portion for counter-balancing against loads being lifted, has created a very unusual and difficult problem to handle, thus resulting in rather inflexible steering arrangements.

After considerable experimentation and study, I have developed a most superior steering mechanism for towable lift trucks, and the like, which provides for a miximum of flexibility in terrain handling and also provides for a maximum stability and uniformity of steering characteristics with a minimum of operator effort.

Among other things, it is to be noted that during a turn of a two wheel axle, of necessity, one wheel must travel a greater distance, and thus basically, a larger turning circle than the other. For purposes of this application I shall refer to the "outer wheel" as the wheel which has the greater distance to travel in a turn, and the "inner wheel" as the wheel which has the lesser distance to turn. Under most circumstances, one or both of the wheels will be slipping slightly in its contact with the surface in order to accomplish the turn. However, with the particular yoke arrangement I have made and the center pivot mount I have arranged with the pivot point being at a point distant from the axial line between the two wheels, I have been able to create an outer wheel turning radius at all times greater than inner wheel turning radius regardless of which wheel is inner or outer, thus resulting in superior characteristics and no necessity for either of the wheels to slip.

After having fully developed the mechanism, I have now extensively tested and have ultimately made refinements which have resulted in a most unique steering mechanism capable of totally unusual and unexpected results in the towable lift truck industry.

It is an object of this invention to provide a steering assembly for a lift truck wherein there is a center mounted yoke control with adjustable control arms connected to the two steering wheels (generally at the rear).

Another object of this invention is to provide an apparatus as described wherein the entire steering mechanism is activated by a simple hydraulic cylinder.

Another object of this invention is to provide such a steering mechanism as is herein described wherein a minimum of wearing parts is involved for maximum life.

Another object of this invention is to provide such a device as is herein described which is capable of withstanding the rigors of transport and use on uneven terrain.

Still another object is to provide such a device as herein described wherein it is possible to impart a larger turning radius to the outer wheel, than the inner wheel, in a turn.

The foregoing and other objects and advantages of this invention will become apparent to those skilled in the art upon reading the description of a preferred embodiment in conjunction with a review of the appended drawings.

BRIEF DESCRIPTION OF THE DRAWINGS

FIG. 3 is a top elevation of the steering axle and steering mechanism of this invention;

FIG. 4 is an exploded view of the steering control pivot arm utilized in the apparatus of FIG. 3;

FIG. 5 is a rear elevation of the apparatus of FIG. 3;
FIG. 6 is a section on 6—6 of FIG. 5;
FIG. 7 is a section on 7—7 of FIG. 5;
FIG. 8 is a front elevation of the axle, with the wheel carrying assemblies broken away;
FIG. 9 is a partial section on 9—9 of FIG. 3;
FIG. 10 is a schematic top elevation showing the wheels when running straight;
FIG. 11 is a top elevation schematic view of the same apparatus of FIG. 10 in a left turn; and
FIG. 12 is a view as FIG. 11 except in a right turn.

DESCRIPTION OF A PREFERRED EMBODIMENT

Figure 1:
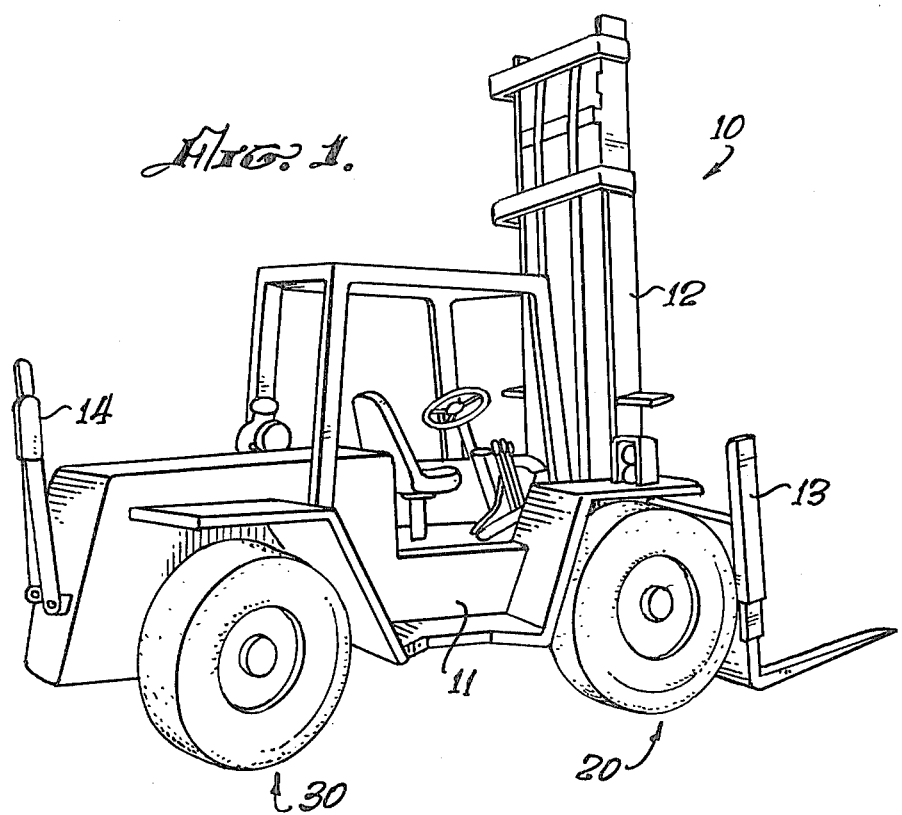
FIG. 1 is a perspective of a lift truck embodying a preferred mechanism of this invention.
Figure 2:
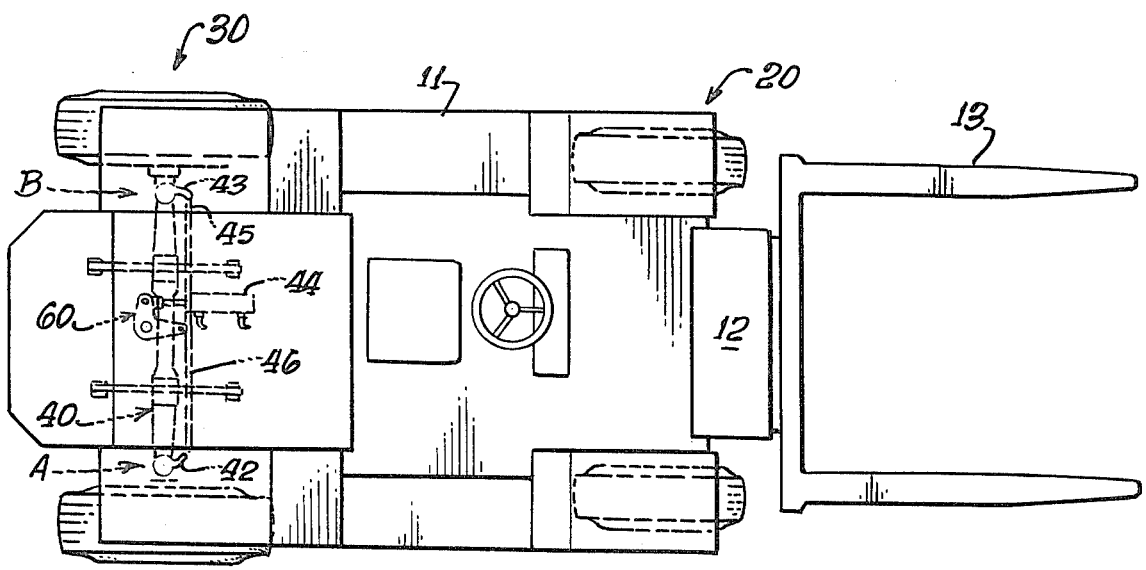
FIG. 2 is a top elevation of the truck of FIG. 1 with certain elements of the invention illustrated in phantom beneath portions of the truck.

FIG. 1 illustrates a lift truck utilizing an embodiment of this invention. The truck, generally 10, comprises a truck body 11, having lift fork mechanism 13 and lifting mast 12, as will be understood by those skilled in the art. A towing bar 14 is provided at the rear of the vehicle for connection to a truck, or the like, in a manner known to those skilled in the art. The lift truck has a front wheel assembly 20 and a rear wheel assembly 30. Customarily in lift trucks the rear wheel assembly is the steering wheel assembly and, in this case, it is the steering assembly.

The entire axle assembly, generally 40, is illustrated in FIG. 3. The actual wheel carrying assemblies have been broken away since it will be understood that they are connected respectively at A and B.

The apparatus consists of an axle casting 41, or the like, with spring mounting positions 41a and 41b, or the like. The lift truck itself, of course, is connected to this axle at those latter positions.

At the two ends of the axle there are pivot positions 51 and 53 (generally at the king pin or the like) which will carry the steering connection arms 42 and 43.

By ball connection joints, as are known in the art, at 47—54 and 50—52, the steering connecting arms 43 and 42 are connected to steering control rods 45 and 46, respectively. Appropriate end connections 48 and 49 are utilized to connect to the area 59, with flexible steering connecting rod ends as are known to those skilled in the art. These ends are 59a and 59b, respectively, and can be of the type such as is known as "Heim" rods, or the like.

All of this connection being described will be known to those skilled in the art; the unusual feature here being their connection to the steering arm yoke apparatus, generally 60.

With attention directed to FIG. 4, the details of the mounting and construction of the center pivot control arm, generally 60, will be clear. There is a member 61, having two pivot positions 64 and 65, as illustrated, connected by flange member 62 to dog-leg shaped member 63 which has appropriate pivot positions 66 and 68 upon members 63c and 63d. 63a is an offset carrying member with support web 63b.

The bearing, generally 80, is connected to the axle 41 by bolts through holes 83, as will be understood when considering FIG. 5.

The pivot pin 69 has a head 76 with a flat 77 which rests against the axle and prevents turning of the pin 69. The pin is held in position through pivot position 64, bearing 80, and pivot position 67, by means of washer 73 and nut 74. There is a hole 75 in the nut 74 and a hole 72 through the threaded portion 71 so that a pin may be inserted to prevent loosening of the nut.

The activation cylinder 44 is connected to the end 63c by means of mounting through hole 68, as will become apparent in studying FIG. 5 at area 100.

Reviewing FIG. 5, the assembly of the pivot arm, generally 60, becomes quite clear. The bearing 80 is fastened by bolts 83a to the axle 41. The two arms 61 and 63 pass respectively below and above the axle.

The left steering wheel (viewed from the rear) is activated by the connection at 59a through rod 45, and the right wheel is connected and activated by 59b through rod 46.

FIGS. 6 and 7 illustrate the connection from the hydraulic cylinder which activated the steering. The hydraulic cylinder 44 has rod 106. It is understood that this is a double acting hydraulic cylinder and, thus, can move the rod in or out of the cylinder under pressure.

The connection at 100 is a customary ball and socket connection, as is illustrated, wherein there is an elongated chamber 102 with two spring-loaded ends 104 and 103, each having a configuration to accept the circular configuration of the ball 101. Customary lubrication and the like is provided, but not described in detail.

The ball and socket arrangement is connected through threaded boss, or the like, to the end 63c through the hole 68 in a manner customary in the art.

FIGS. 8 and 9 add no new elements, but by giving a detail from 9—9 of FIG. 3 gives more information, and by providing a front view of the axle completes the orientation of the elements previously described.

The FIGS. 10, 11, and 12 are important in understanding the unique turning arrangement wherein the inner wheel on each turn always has a shorter radius of turn than the outer wheel.

Although the elements are the same basically as previously described, a new series of numbering has been utilized and only a few of the elements have been shown since this schematic sieres of views is only to illustrate the turning effect.

The axle 141 carries two wheels 110 and 120. The curved steering arm 143 and curved steering arm 142 are mirror images of one another and are connected at 154 and 152 respectively through connecting rods 145 and 146 to pivot point 159 on the steering yoke 160 which is pivotally mounted at 174 to the axle 141. The hydraulic cylinder 144 activates the unit as will be clear to those skilled in the art.

Because of this center mounting, and the movement of the wheels as will be indicated in both a left and a right turn, the steering radius, or turning radius of the outer wheel always remains a longer radius. This is clear in the illustrations of FIGS. 11 and 12.

The effect of the turning where the items are mounted in this manner is that the turning from the position slightly to the rear of the axle at 174 causes the points 154 and 152 to create a different radius of turning to each wheel as is illustrated.

In the straight position, the wheels are running parallel. However, when the wheels are pulled one way or the other by means of a steering apparatus the relative axial direction of the wheels becomes different. If the wheel axis should always remain parallel, then the two wheels would have an equal turning radius. However, as it is seen, there is a difference between the two, resulting in the desired feature.

Another important point, and one not previously mentioned, is that it will be noted that the king pin bushings (201 and 202 on FIG. 8) have an angular displacement. This, combined with the connection as previously described creates the different turning radiuses and causes the correct cant to be imparted to the wheels.

While the embodiment of this invention shown and described in fully capable of achieving the objects and advantages desired, it is to be understood that such embodiment has been shown and described solely for purposes of illustration and not for purposes of limitation.

I claim:

1. The combination with the steering axle of a lift truck of (1) A first wheel pivotally mounted at the first end of said axle; (2) A second wheel pivotally mounted at the second end of said axle; (3) A pivot arm comprising a pair of parallel plates, one of which parallel plates passes over and the other of which parallel plates passes under the said axle, and wherein which said parallel plates have mounting means for mounting upon a pivotal mounting means attached to said axle wherein the pivotal mounting means includes a pivot pin and a bearing; (4) An elongated arm connected adjacent one end to said pair of parallel plates at an essentially 90 degree relationship to the planes in which said plates lie; (5) Means fastening said elongated arm at its end opposite from the end adjacent the said pair of plates to means capable of activating said elongated arm in such manner as to cause the pair of plates to pivot in their pivotal pounting; (6) First elongated connecting means having two ends, fastened at one of its ends to the pivotal mounting of the first wheel and fastened at its other end to the pivot arm pivotally mounted upon the said axle; and (7) Second elongated connecting means having two ends, fastened at one of its ends to the pivotal mounting of the second wheel and fastened at its other end to the pivot arm, pivotally mounted to the said axle.

2. The apparatus of claim 1 wherein the connecting means and the pivotal arm are so arranged that the outer wheel of turn of the axle turns upon a longer radius than the inner wheel.

3. The apparatus of claim 2 wherein the wheels are connected to the axle in such manner as to be canted.

* * * * *